US012717915B1

(12) United States Patent
Huq et al.

(10) Patent No.: US 12,717,915 B1
(45) Date of Patent: Aug. 25, 2026

(54) SCANNING OF APPLICATION PROGRAMMING INTERFACE CHAINS

(71) Applicant: Trend Micro Incorporated, Tokyo (JP)

(72) Inventors: Numaan Huq, Toronto (CA); Zhemin Lin, Taipei (TW); Roel Reyes, Pasig (PH); Josiah Hagen, Irving, TX (US); Morton Swimmer, Wedel (DE)

(73) Assignee: Trend Micro Incorporated, Tokyo (JP)

( * ) Notice: Subject to any disclaimer, the term of this patent is extended or adjusted under 35 U.S.C. 154(b) by 35 days.

(21) Appl. No.: 18/670,183

(22) Filed: May 21, 2024

Related U.S. Application Data

(63) Continuation-in-part of application No. 18/513,127, filed on Nov. 17, 2023, now Pat. No. 12,511,828.

(51) Int. Cl.
*G06F 21/56* (2013.01)
*G06F 21/54* (2013.01)
*G06F 21/55* (2013.01)

(52) U.S. Cl.
CPC ............ *G06F 21/564* (2013.01); *G06F 21/54* (2013.01); *G06F 21/554* (2013.01)

(58) Field of Classification Search
CPC ....... G06F 21/564; G06F 21/54; G06F 21/554
See application file for complete search history.

(56) References Cited

U.S. PATENT DOCUMENTS 9,235,704 B2 1/2016 Wooton et al.
9,652,614 B2 5/2017 Hulten et al.
11,354,409 B1 * 6/2022 Kenefick ................. G06F 21/51
12,223,066 B2 * 2/2025 Dhawan ................ G06F 21/604
2018/0278639 A1 * 9/2018 Bernstein ................ G06F 21/53
2018/0357413 A1 * 12/2018 Rivera .................. G06F 21/554
2021/0042023 A1 * 2/2021 Kerber, III ................ G06F 8/65
2023/0102377 A1 * 3/2023 Ohlsen .................. A63F 13/352 463/42

(Continued)

FOREIGN PATENT DOCUMENTS

CN 113051561 A * 6/2021 ........... G06F 21/563

OTHER PUBLICATIONS

Holt, D. (2022). Why the spatial web demands a new protocol—part 4—IEEE & AI governance. Spatial Web AI. https://deniseholt.us/why-the-spatial-web-demands-a-new-protocol-part-4-IEEE/ (Year: 2022).*

(Continued)

*Primary Examiner* — Yin Chen Shaw
*Assistant Examiner* — Nicholas Joseph Diluzio
(74) *Attorney, Agent, or Firm* — Beyer Law Group LLP

(57) ABSTRACT

Interactable objects of a virtual world are scanned to determine if they are malicious. A spatial resource identifier (SRI) of an interactable object is received in a virtual reality (VR) interface that is employed by a user to access the virtual world. The interactable object is scanned when it has been rendered and is in range of the user. The scanning includes querying a backend system, using the SRI, for a reputation of the interactable object when the VR interface is incapable of scanning the interactable object. Application programming interfaces (APIs) chains are scanned as packaged with interactable objects or separately from interactable objects.

13 Claims, 15 Drawing Sheets

(56) References Cited

U.S. PATENT DOCUMENTS

| | | | | |
|---|---|---|---|---|
| 2023/0127438 | A1* | 4/2023 | Karadayi | G06T 17/005<br>345/419 |
| 2023/0141160 | A1* | 5/2023 | Prabhakar | G06F 16/2379<br>714/47.1 |
| 2023/0196766 | A1* | 6/2023 | Pla I Conesa | G06V 10/7715<br>382/190 |
| 2024/0203052 | A1* | 6/2024 | Foco | G06T 7/33 |
| 2024/0233292 | A1* | 7/2024 | Tichenor | G06V 20/20 |
| 2025/0111037 | A1* | 4/2025 | Saha | G06F 21/577 |
| 2025/0153049 | A1* | 5/2025 | Holly | A63F 13/35 |

OTHER PUBLICATIONS

"HSML: Hyperspace Modeling Language", Spatial Web Foundation, https://spatialwebfoundation.org/protocols/contracts/, Downloaded Aug. 14, 2023.

"The Spatial Web and Web 3.0", Deloitte Insights, https://www2.deloitte.com/content/dam/insights/us/articles/6645_Spatial-web-strategy/DI_Spatial-web-strategy.pdf, 2020, Downloaded Aug. 14, 2023.

"Fight Cyber Threats", Intel471, https://intel471.com/#::text=Intel%20471%20provides%20you%20with.prioritized%20by%20risk%20and%20impact., Downloaded May 6, 2024.

"Smart object", Wikipedia, https://en.wikipedia.org/wiki/Smart_object, Downloaded Sep. 27, 2023.

Peter H. Diamandis, "The Spatial Web—Part 1", Peter H. Diamandis LLC, https://www.diamandis.com/blog/the-spatial-web-part-1, Nov. 11, 2018.

Peter H. Diamandis, "The Spatial Web—Part 2", Peter H, Diamandis LLC, https://www.diamandis.com/blog/the-spatial-web-part-2, Nov. 18, 2018.

Peter H. Diamandis, MD, "The Spatial Web Will Map Our 3D World—And Change Everything In the Process", singularityhub, Nov. 16, 2018.

* cited by examiner

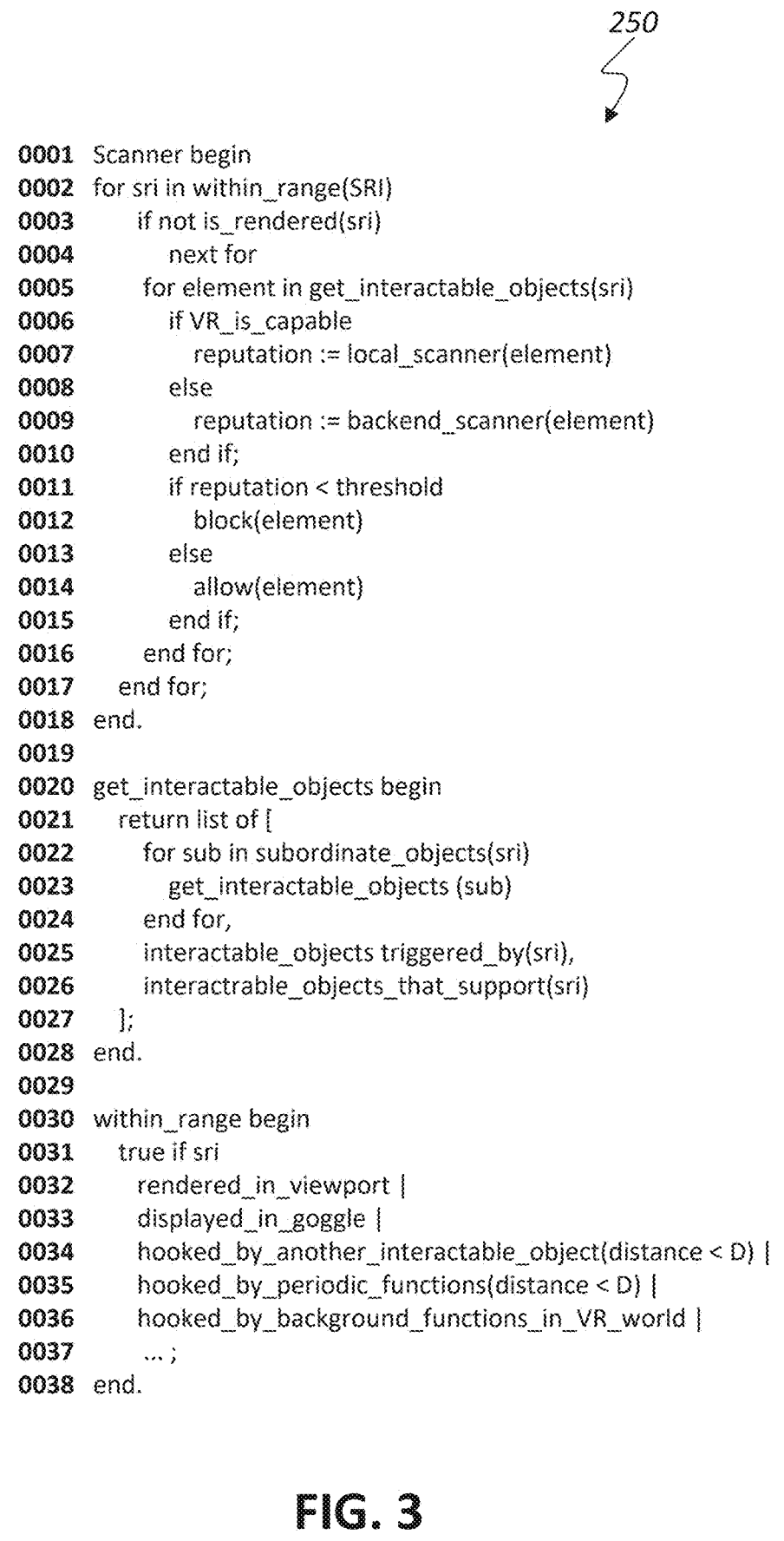

250

```
Scanner begin
for sri in within_range(SRI)
    if not is_rendered(sri)
        next for
    for element in get_interactable_objects(sri)
        if VR_is_capable
            reputation := local_scanner(element)
        else
            reputation := backend_scanner(element)
        end if;
        if reputation < threshold
            block(element)
        else
            allow(element)
        end if;
    end for;
  end for;
end.

get_interactable_objects begin
  return list of [
    for sub in subordinate_objects(sri)
        get_interactable_objects (sub)
    end for,
    interactable_objects triggered_by(sri),
    interactrable_objects_that_support(sri)
  ];
end.

within_range begin
  true if sri
    rendered_in_viewport |
    displayed_in_goggle |
    hooked_by_another_interactable_object(distance < D) |
    hooked_by_periodic_functions(distance < D) |
    hooked_by_background_functions_in_VR_world |
     ... ;
end.
```

FIG. 3

Containerized Application
300
301
302
303
304
305
310
311
312
313
314
315

| Layer | Component | Description | Example/Details |
|---|---|---|---|
| **Data Layer** | Based Object Data | Core properties of the guitar (size, share, colour, etc.) | {"id": "VRGuitar001", "type": "StringInstrument", "dimensions": {"length": "100cm", "width": "35cm", "height": "8cm"}, "material": "VirtualWood", "color": "Sunburst"} |
| | Metadata | Descriptive information about the guitar | {"creator": "User123", "creationDate": "2023-01-15", "uniqueID": "VRG-2023-01-15-123"} |
| | State Data | Information about the guitar's current state | {"position": {"x": 0, "y": 0, "z": 0}, "orientation": {"pitch": 0, "yaw": 0, "roll": 0}, "inUse": false} |
| **3D Graphics Layer** | Modeling | Detailed 3D models defining the guitar's geometry | 3D model file (.obj, .fbx, etc.) |
| | Texturing | Surface textures and materials | Image files for texture (.png, .jpg) |
| | Animation | Rigging and animation data for moving parts | Animation files for string movement, tuning actions |
| **Interaction Layer** | Physics Engine | Defines physical interactions like vibration, collision, etc. | Unity/Unreal engine physics scripts |
| | User interaction scripts | Code for user interactions with the guitar | Scripts for strumming, tuning, carrying |

| | | | | |
|---|---|---|---|---|
| 504 | **Network Layer** | Synchronization Protocol<br>Data transfer methods | Ensures consistent state across users and environments<br>Mechanisms for transferring object data | WebSocket, real-time protocol<br>REST API, GraphQL |
| 505 | **Code Layer (Logic)** | Core Logic<br>APIs/Interfaces | Programming defining the guitar's behaviour and responses<br>Interaction with different AR/VR systems | C#/C++/C scripts for sound and tuning mechanics<br>`GET /api/vr-guitar/{id}, POST /api/vr-guitar/transfer` |
| 506 | **Compatibility Layer** | Adapters<br>Cross-Platform Standards | Components for adapting to different environments<br>Ensuring adherence to VR/AR industry standards | Scripts to convert data and interaction for Metaverse World<br>Adherence to VRML (Virtual Reality Modeling Language) |
| 507 | **Security Layer** | Encryption<br>Access Control | Protects data during transfer and storage<br>Ensures only authorized interactions with the guitar | HTTPS for API calls, AES encryption for data files, etc.<br>OAuth for user authentication, permissions for modification/transfer |
| 508 | **UX Layer** | Interface Customization<br>Feedback Systems | Tools for user customization of interaction with the guitar<br>Enhancing user engagement with feedback | UI elements for sound, tuning, appearance settings<br>Haptic feedback integration for realistic strumming feel |
| 509 | **Integration Layer** | External Services Connectivity<br>Inter-World Transport Protocol | Connection with external databases, cloud services, or APIs<br>Specialized system for transferring the guitar between VR environments | Integration with music libraries, sound effect APIs<br>Protocol for packaging and unpacking guitar data, maintaining integrity during transfers |

FIG. 7

| | | | | |
|---|---|---|---|---|
| 510 | **Content Management Layer** | Asset Management | Manages the storage, versioning, and retrieval of VR assets | Cloud-based asset library with version control and metadata tagging for 3D models, textures, and sounds |
| | | Localization & Internationalization | Adapting content for different languages and cultures | Text and audio translations, cultural adjustments in context to suit various regions |
| 511 | **Accessibility Layer** | Adaptive Interfaces | Provides accessibility features for diverse user needs | Customizable text sizes, colour contrast settings, support for assistive technologies |
| | | Accessibility Guidelines | Ensures the VR object meets accessibility standards | Compliance with WCAG (Web Content Accessibility Guidelines) or similar standards for VR environments |
| 512 | **Documentation and Support Layer** | User Guides | Comprehensive documentation for users | Interactive tutorials, FAQs, user manuals integrated within the VR environment |
| | | Technical Support | Mechanisms for users to receive technical assistance | In-object support tickets, chat support, community forum access for troubleshooting and technical queries |

FIG. 8

| | | | |
|---|---|---|---|
| **Audio Layer (For Guitar Example)** 513 | Spatial Sound design | Creating audio that reflects the 3D space of the VR environment | Use of 3D audio techniques to simulate sounds sources in specific locations, enhancing realism |
| | Sound effects integration | Incorporating sound effects linked to interactions and events | Custom sound effects for user actions (like strumming the VR guitar) or environment interactions |
| | Ambient soundscapes | Background audio to create immersive environments | Looping ambient tracks that reflect the setting, like urban noise in a cityscape or birds in a forest |
| | Dynamic audio adjustments | Adjusting audio in real-time based on user interactions and context | Volume and pitch adjustments depending on the user's proximity to sound sources or ongoing events. |
| | Audio APIs | Interfaces for integrating and managing audio components | APIs to load, play, and manipulate audio files; integration with external audio libraries or services. |
| | Accessibility features | Ensuring audio is accessible for all users, including those with hearing impairments | Visual indicators or haptic feedback as alternatives to audio cues; adjustable audio settings |
| **Hardware Layer** 514 | Input/Output Devices | Hardware interfaces for user interaction | VR headsets, controllers, haptic gloves, treadmills for motion input, and displays for visual output |
| | Sensor integration | Incorporation of various sensors for enhanced interaction | Headset mounted gyroscopes, accelerometers, motion sensors for tracking user movement and orientation |
| | Performance optimization | Hardware-specific optimizations for smooth operation | GPU and CPU optimization for rendering, efficient memory usage for different hardware specifications |
| | Hardware compatibility | Ensuring compatibility with a wide range of VR hardware | Adapters or drivers to support various VR headsets and controllers from different manufacturers |

| **OS Layer** | System interface | Interface with the underlying operating system for resource management | APIs for memory management, file handling, and process management compatible with various OSes like Windows, macOS, Linux, Android |
|---|---|---|---|
| | Multi-tasking and Threading | Handling multiple processes and threads efficiently | Utilizing OS capabilities for concurrent processing, background tasks handling, and thread synchronization |
| | Security and permissions | Managing security protocols and user permissions at the OS level | Implementing OS-based security measures, handling user permissions for accessing files and hardware resources |
| | Driver integration | Integration with drivers for hardware communication | Ensuring compatibility with graphic drivers, audio drivers, and other peripheral drivers specific to different operating systems |
| | OS-specific features | Leveraging unique features offered by different operating systems | Utilizing Apple's Metal API for macOS/iOS, DirectX for Windows, or Vulkan for cross-platform performance enhancements |
| | Update and maintenance | Managing updates and compatibility with OS updates | Automated update processes, compatibility checks with new OS versions, and backward compatibility support |

FIG. 10

SCANNING OF APPLICATION PROGRAMMING INTERFACE CHAINS

CROSS-REFERENCE TO RELATED APPLICATION

The present application is a continuation-in-part (CIP) of U.S. application Ser. No. 18/513,127, filed on Nov. 17, 2023, which is incorporated herein by reference in its entirety.

TECHNICAL FIELD

The present disclosure is directed to cybersecurity.

BACKGROUND

A virtual world has interactable objects that can be manipulated by users that are logged in the virtual world. An interactable object may be an integral part of the virtual world, created by a user in the virtual world, or brought by a user from another virtual world. An interactable object that is owned by a user is a digital asset of the user. Examples of virtual worlds include those provided by Decentraland, The Sandbox, Hyperfy, Substrata, Voxels (formerly known as Cryptovoxels), Somnium Space, Spatial, Matrix World, HYTOPIA, Netvrk, VRChat, Second Life, etc.

Virtual worlds may be operated by different entities. For example, a virtual world may be operated by a retail company to allow customers to virtually walk around aisles, select an item from a shelf, and experience the item before purchasing. Such virtual world may also allow customers to pay using digital currency that is accepted in the virtual world, and receive a physical version of the item by regular mail. As another example, a second virtual world may be operated by a gaming company to allow players to roam, explore, work in, etc., the virtual world. Yet another example, a third virtual world may be operated by a social networking company to allow users to meet, establish an economy, etc. in a virtual world that is a mirror of the physical world. A collection of interconnected virtual worlds is also referred to herein as a "metaverse."

A virtual world may allow a physical object to be digitized and represented as a digital twin in the virtual world. For example, a guitar may be digitized and represented as a virtual guitar that a user can play in the virtual world. As another example, an Internet of things (IOT) device, such as a smart switch, smart alarm clock, smart radio, etc., may have a corresponding digital representation in the virtual world that the user can manipulate. An action that is taken by a user on an interactable object in the virtual world (e.g., flip a switch in the virtual world) may be linked to a corresponding physical object in the real world (e.g., activate a smart switch in the real world).

An application programming interface (API) is a set of protocols, functions, and tools for building software and applications. It specifies how software components should interact and allows different software applications to communicate with each other. APIs abstract the complexity of a system into a simplified interface, enabling developers to integrate and extend the functionalities of external systems or services without having to understand their internal workings. This facilitates the development of applications that can leverage third-party services, interact with other applications or devices, or access databases and hardware components efficiently. By defining clear methods for interaction, APIs enable modularity in software development, promote reuse of services, and support the scalability and maintenance of systems. A code section may call an API, i.e., call an API function, to use that API's functionality.

Embodiments of the present invention pertain to scanning of APIs in general and APIs that are containerized with interactable objects to determine if the APIs are malicious.

BRIEF SUMMARY

In one embodiment, a method of scanning interactable objects of a virtual world includes receiving a plurality of containers of a plurality of interactable objects of one or more virtual worlds. For each container of the plurality of containers, a code layer is extracted from a plurality of layers of an interactable object in the container, an application programming interface (API) chain is identified in the code layer, the API chain is scanned to determine its reputation, and a result of the scanning is stored in an API chain database, wherein the API chain comprises a plurality of APIs that are called in the code layer. A target container of a target interactable object is received. A target API chain is identified in the target interactable object. The target API chain is compared to API chains in the API chain database to identify a matching API chain that matches the target API chain. The target interactable object is detected to be malicious based at least on the matching API chain having a malicious reputation. A response action is performed responsive to detecting that the target interactable object is malicious.

In another embodiment, a computer system comprises at least one processor and a memory, the memory storing instructions that when executed by the at least one processor cause the computer system to: receive a plurality of containers of a plurality of interactable objects of one or more virtual worlds; for each container of the plurality of containers, extract a code layer from a plurality of layers of an interactable object in the container, identify an API chain in the code layer, scan the API chain to determine a reputation of the API chain, and store a result of the scan in an API chain database, wherein the API chain comprises a plurality of APIs that are called in the code layer; receive a target container of a target interactable object; identify a target API chain of the target interactable object; compare the target API chain to API chains in the API chain database to identify a matching API chain that matches the target API chain; and detect that the target interactable object is malicious based at least on the target API chain matching the matching API chain, wherein the matching API chain has a malicious reputation.

In yet another embodiment, a method of scanning API chains includes receiving a plurality of application programs. For each application program of the plurality of application programs, an API chain is identified and scanned to determine its reputation, wherein the API chain comprises a plurality of APIs that are called in the application program. A target API chain is identified in a target application program. The target API chain is compared to API chains of the plurality of application programs to identify a matching API chain that matches the target API chain. The target application program is detected to be malicious based at least on the matching API chain having a malicious reputation.

These and other features of the present disclosure will be readily apparent to persons of ordinary skill in the art upon reading the entirety of this disclosure, which includes the accompanying drawings and claims.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 3 shows a pseudocode for scanning interactable objects of a virtual world, in accordance with an embodiment of the present invention.

FIGS. 6-10 show a table that illustrates layers of an interactable object, in accordance with an embodiment of the present invention.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
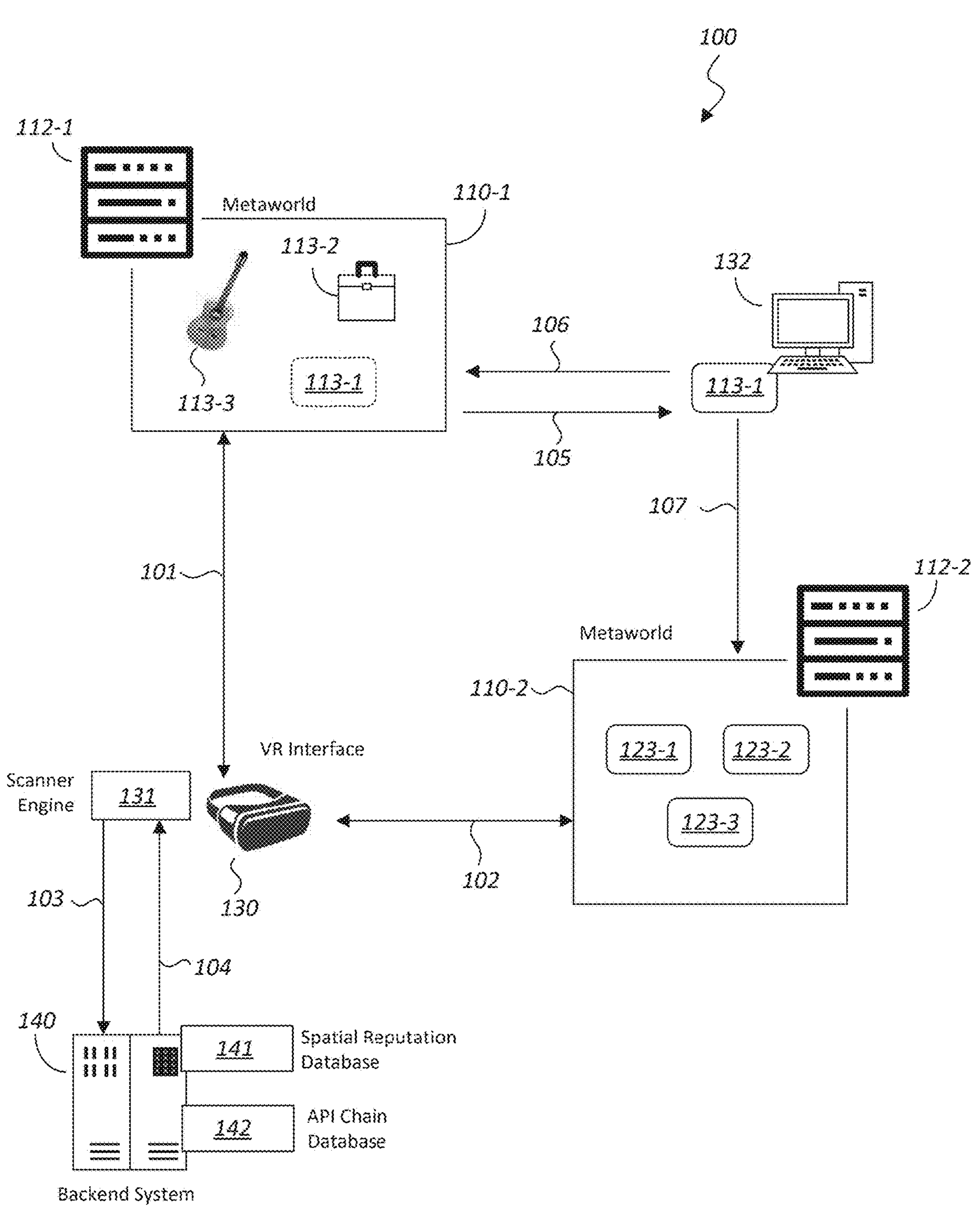
FIG. 1 shows a block diagram of a system for scanning interactable objects of a virtual world, in accordance with an embodiment of the present invention.

FIG. 1 shows a block diagram of a system for scanning interactable objects of a virtual world, in accordance with an embodiment of the present invention. In the example of FIG. 1, a system 100 comprises a virtual reality (VR) interface 130 and a backend system 140. The system 100 is configured to scan interactable objects of virtual worlds 110 (i.e., 110-1, 110-2, etc.) to determine if the interactable objects are malicious.

A virtual world 110 may be implemented on a computer system 112 (i.e., 112-1, 112-2, etc.). A computer system 112 may comprise interconnected computers, a cloud computing platform, or other computing infrastructure. The computer systems 112, the VR interface 130, and the backend system 140 may communicate over a computer network (e.g., the public Internet) in accordance with a predetermined protocol that is secure and reliable (e.g., Hypertext Transfer Protocol Secure (HTTPS)). Embodiments of the present invention are protocol-agnostic in that they are applicable to any suitable protocol.

In the example of FIG. 1, a user accesses a virtual world 110 using the VR interface 130 (see arrows 101 and 102). In one embodiment, the VR interface 130 is a VR headset/goggles. The VR interface 130 includes a screen that displays elements of the virtual world 110, such as interactable objects. A virtual world 110 renders elements that are within or may enter a field of view of the user as the user roams the virtual world 110. In one embodiment, an element is rendered when data for displaying the element on the screen of the VR interface 130 has been received in the VR interface 130. Such data may be stored in the display buffer of the VR interface 130. As can be appreciated, rendered elements are not necessarily displayed on the screen of the VR interface 130, e.g., when the interactable object is not within the field of view of the user. As a particular example, a rendered element does not have to be displayed on the display screen of the VR interface 130 when the rendered element is behind the user.

The user may interact with an interactable object by making hand gestures, utilizing a hand-held interface, wearing a smart interface (e.g., bodysuit, gloves), or by some other way that is suitable for the given virtual world. For example, the Apple Vision Pro™ headset has deeply incorporated eye tracking that allows users to select parts of on an object just by looking at them. Examples of interaction with an interactable object include moving the interactable object to another location within a virtual world or to another virtual world, changing features of the interactable object, activating features of the interactable object, etc.

Generally, an interactable object is an artifact in a virtual world that users can interact with, as opposed to simply being a passive element of the virtual world. A user that is logged in the virtual world may take actions on interactable objects in that virtual world. For example, a user may play an interactable object that represents a guitar, turn on an interactable object that represents a wall switch, wear an interactable object that represents a backpack, sit on an interactable object that represents a chair, etc.

A virtual world does not necessarily have to meet real world expectations. As an example, a wall switch and a lamp that is supposed to be lit when the switch is activated may each be an interactable object. However, in a virtual world, activating the switch will not necessarily turn on the lamp. The switch may be malicious and instead empty the user's crypto wallet or download a virus while turning on the lamp. As another example, the strings, tuning pegs, etc. of a guitar may each be an interactable object. In the virtual world, activating the strings of the guitar may generate sounds, or might just turn on the lamp in the room.

An interactable object that was created or pre-populated in a virtual world is "native" to that virtual world. In the example of FIG. 1, interactable objects 113 (i.e., 113-1, 113-2, 113-3, etc.) are native to the virtual world 110-1, whereas interactable objects 123 (i.e., 123-1, 123-2, 123-3, etc.) are native to the virtual world 110-2. An interactable object has a designated spatial resource identifier (SRI) for identifying the interactable object. The SRI distinguishes the interactable object from other interactable objects. The SRI of an interactable object may be assigned upon creation in a virtual world, and may be unique to the interactable object at least in that virtual world. The SRI may be standardized between virtual worlds, e.g., by agreement between particular virtual worlds. The SRI may also be augmented by or mapped to another identifier in a virtual world in which the interactable object is non-native.

An interactable object has corresponding program code ("code"; instructions) that is executed by at least one processor to perform the functionalities of the interactable object. An interactable object may thus be compromised by a cyberattack, e.g., infected with malware. An interactable object may also be brought into the virtual world by a cybercriminal for a malicious purpose. Accordingly, it is important to scan (i.e., evaluate or analyze) interactable objects for malware. However, the multitudes of interactable objects in a virtual world, not to mention interactable objects in the entire metaverse, pose a significant hurdle in scanning interactable objects. Also, unlike static webpages, users dynamically perceive and interact with interactable objects in a virtual world. Furthermore, some VR interfaces may not have enough computing resources to properly scan interactable objects.

A backend system 140 may comprise a computer system that supports cybersecurity operations in the VR interface 130. The backend system 140 may comprise interconnected computers, a cloud computing platform, or other computing infrastructure. The backend system 140 may communicate with the VR interface 130 over the public Internet, such as in accordance with HTTPS or other suitable communication protocol. In one embodiment, the backend system 140 includes storage space (e.g., cloud storage, network attached storage, local data storage) that stores a spatial reputation database 141 and an application programming interface (API) chain database 142. The spatial reputation database 141 indicates a reputation of a particular interactable object, such as whether the interactable object is malicious, normal, or is unknown (i.e., has an unknown reputation). The reputation of an interactable object and API chains may be determined off-line by cybersecurity experts using machine learning, data mining, malware scanning, sandboxing, or other way without detracting from the merits of the present invention. The reputation of an interactable object and API chains may also be determined from threat information provided by external sources, such as feeds from various cybersecurity vendors, cybersecurity organizations, customer feedback, etc. In one embodiment, reputations of interactable objects are identified in the spatial reputation database 141 by corresponding SRIs of the interactable objects.

Application programs ("applications") may be containerized to facilitate creation and deployment of interactable objects in and between virtual worlds. That is, an application of an interactable object may be encapsulated in a software container. The containerized application may include an API pipeline, which includes an API chain. As its name indicates, an API chain is a sequence of APIs. Generally, an API chain is a sequence of APIs or a combination of API services that are called in a specific order. An API chain may comprise one API calling another API (e.g., a first API that calls a second API, a third API that is called by the second API); several APIs that are called one after another in a code section; and other combination of API calls made in a specific order. API chains may be obtained from third-party providers, i.e., vendors or developers that are not associated with the creator of the containerized application. In other words, an interactable object may comprise an application with portions provided by different entities, including API chains from different providers.

The API chain database 142 indicates a reputation score of a containerized API chain, such as an API chain that is included in a containerized interactable object. The reputation score indicates a security risk posed by an API chain, and may be utilized to determine whether or not the API chain can be trusted. In one embodiment, the lower the reputation score, the higher the security risk posed by the API chain. The reputation score of the API chain may be compared to a predetermined threshold to determine if the API chain is malicious. An API chain is deemed malicious when its reputation score is lower than the threshold. A hash value of APIs in the API chain may be calculated using a suitable hash function, and the hash value may be stored in the API chain database 142. Hash values of API chains may be clustered in the API chain database 142.

The VR interface 130 comprises at least one processor and a memory, with the memory storing instructions that when executed by the at least one processor cause the VR interface 130 to perform operations described herein. In the example of FIG. 1, the VR interface 130 runs instructions of a scanner engine 131. The scanner engine 131 is configured to receive features of an interactable object that may be used in the scanning of the interactable object. In one embodiment, these features of the interactable object include the SRI of the interactable object; the spatial location of the interactable object in the virtual world; other interactable objects that are subordinate to the interactable object ("subordinate interactable objects"); binary, code, functions, smart contract, etc. that are triggered by the interactable object; and binary, code, functions, smart contract, etc. that contribute to the interactable object (e.g., give the interactable object shape, value, text, etc.). Other features of the interactable object that may be received by the VR interface 130 may include data of the following:

(a) Interactivity: Interactive features that allow users to engage with the interactable object. The interactive features may include the ability to be moved, modified, or activated in some way.

(b) 3D Model: A 3D model that represents the interactable object visually within the virtual world. The 3D model could potentially be manipulated or changed by users.

(c) Metadata: Metadata of the interactable object describing its properties, history, ownership, and other relevant information.

(d) APIs: APIs exposed by the interactable object to allow it to interact with other interactable objects or systems. These APIs may include APIs for moving the interactable object, changing its properties, or triggering actions.

(e) Security Features: The interactable object may contain security features to protect against attacks. These security features may include encryption, access controls, etc.

(f) State Information: The interactable object may maintain state information, allowing it to remember its status or the outcomes of interactions with users.

(g) Physics Properties: To mimic real-world interactions, the interactable object may have physics properties, such as mass, velocity, friction, and collision responses.

(h) Ownership Rights: The interactable object may have associated ownership rights, allowing users to buy, sell, or trade the interactable object.

(i) Behavior Scripts: The interactable object may contain scripts that dictate its behavior in response to certain events or interactions.

As can be appreciated, the features of the interactable object that may be received by the VR interface 130 from the virtual world may vary depending on the particulars of the virtual world. As will be further discussed below, the features of the interactable object may be provided by code or data in different layers.

The scanner engine 131 scans the interactable object based on its features to determine if the interactable object is malicious. The scanner engine 131 is configured to block interactable objects that are found to be malicious. The interactable object may be blocked by preventing the user from interacting with the interactable object, including by highlighting the interactable object, disabling interfaces that allow the user to interact with the interactable object, etc.

Because the VR interface 130 may not have the computing resources to properly scan an interactable object, the scanner engine 131 may be configured to scan a limited subset of interactable objects of a virtual world. In one embodiment, the scanner engine 131 does not initiate scanning of an interactable object that has not been rendered by the virtual world and/or the VR interface 130. Limiting the scanning to rendered elements advantageously makes the scanning more manageable.

Also, in one embodiment, the scanner engine does not initiate scanning of an interactable object that is not within a predetermined distance to the user in the virtual world. That is, an interactable object is not scanned unless the interactable object gets in range relative to the user. The range distance may be in terms of a coordinate system employed in the virtual world for identifying the spatial location of users and interactable objects. The range distance for triggering scanning may depend on the type of the interactable object. It is to be noted that an interactable object may be in range of the user even when not in front of or being viewed by the user. In other words, an interactable object may be rendered and within a predetermined range of the user in the virtual world for scanning even when the interactable object is not displayed on the display screen of the VR interface 130.

The scanner engine 131 may locally scan an interactable object by looking for features that are indicative of malicious interactable objects, with the features being represented in signatures, rules, lists, etc. For example, the interactable object may have ownership metadata that may be matched against a blacklist maintained by the scanner engine 131. As another example, the interactable object may have a script that may be matched against signatures of malicious scripts maintained by the scanner engine 131. Yet another example, the VR interface 130 may include a local store of reputation information of a limited number of malicious interactable objects. The scanner engine 131 may consult such local storage to determine the reputation of some interactable objects.

The VR interface 130 may not have the computing resources to locally scan an interactable object, in which case the scanner engine 131 is configured to consult the backend system 140 for the reputation of the interactable object.

For example, the scanner engine 131 may obtain an SRI of an in range and rendered interactable object, and provide the SRI to the backend system 140 (see arrow 103). The backend system 140 uses the SRI to consult the spatial reputation database 141 for the reputation of the interactable object. The backend system 140 uses the SRI to locate the reputation of the interactable object in the spatial reputation database 141 and returns the reputation of the interactable object to the scanner engine 131 (see arrow 104). The scanner engine 131 blocks or allows the interactable object depending on its reputation.

As another example, the scanner engine 131 may obtain a containerized application of the interactable object. The scanner engine 131 may provide the containerized application or an API chain in the containerized application to the backend system 140 (see arrow 103). The backend system 140 may consult the API chain database 142 to obtain a reputation score of an API chain in the containerized application, and provide a reputation of the API chain (and hence of the interactable object) to the scanner engine 131 based on the reputation score (see arrow 104).

A user may check out, from a virtual world, an interactable object that is owned by the user. The interactable object is no longer in the virtual world once it is checked out of the virtual world. The user may check out an interactable object for various reasons, including to adjust features of the interactable object using tools provided by the virtual world, to move the interactable object to another virtual world, etc. In the example of FIG. 1, the user employs a computer 132 to check out (i.e., remove) the interactable object 113-1 from the virtual world 110-1 (see arrow 105). The user may thereafter check in (i.e., bring) the interactable object 113-1 back to the virtual world 110-1 (see arrow 106). In one embodiment, a virtual world does not scan an interactable object being checked in the virtual world if the interactable object is native to the virtual world. In the example of FIG. 1, returning the interactable object 113-1 to the virtual world 110-1 does not necessarily have to initiate scanning of the interactable object 113-1.

The user may also move the interactable object 113-1 to the virtual world 110-2 (see arrow 107). Because the interactable object 113-1 is not native to the virtual world 110-2, the interactable object 113-1 is scanned before being allowed into the virtual world 110-2. A virtual world may take advantage of the scanning service provided by the backend system 140 to scan an interactable object that is entering or is in the virtual world. For example, a virtual world may provide the SRI of an interactable object to the backend system 140 to determine a reputation of the interactable object. The virtual world may also provide a containerized application of the interactable object to the backend system 140. The backend system 140 may identify one or more API chains in the containerized application and consult the API chain database 142 to determine reputation scores of the API chains.

Figure 2:
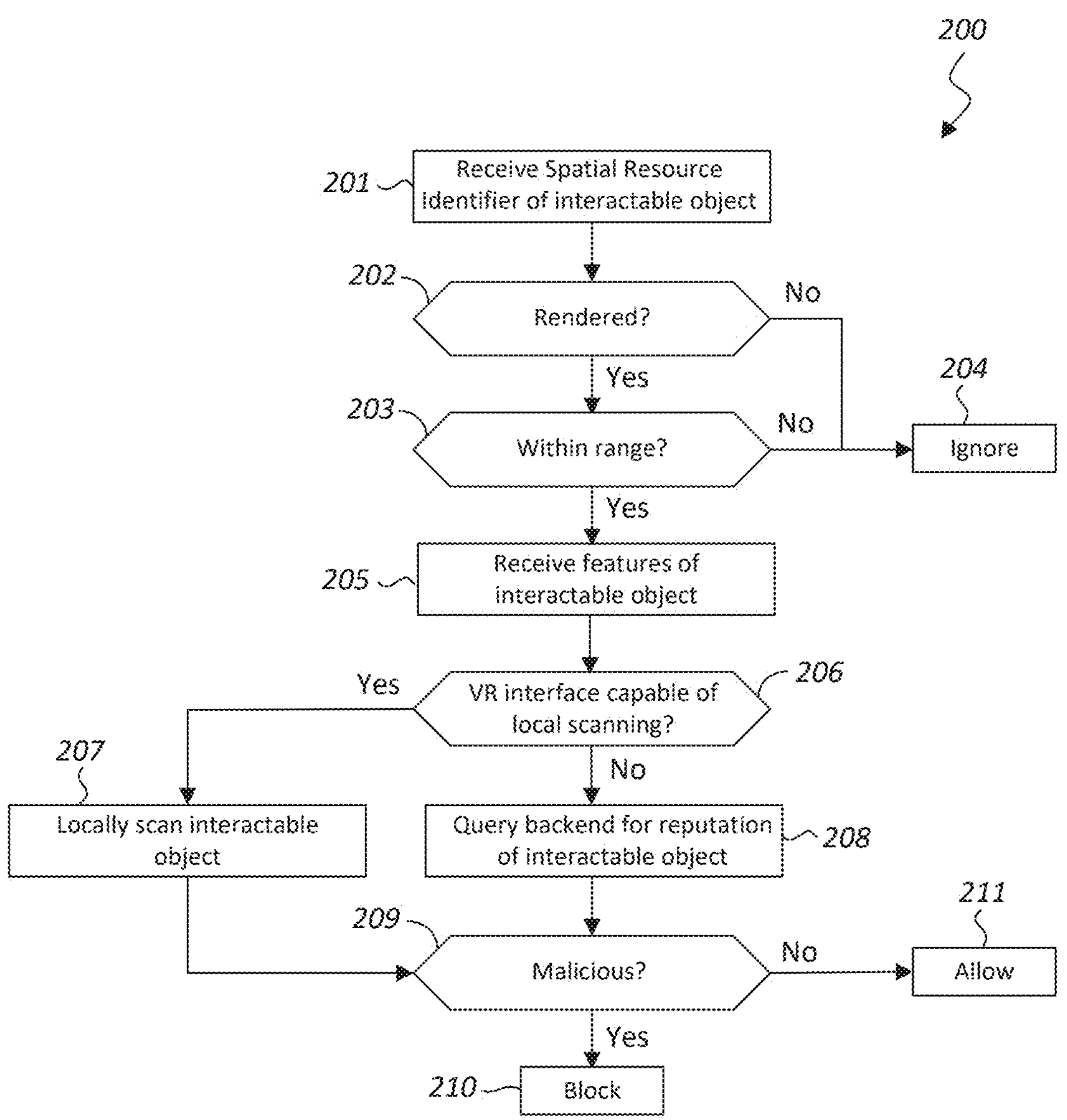
FIG. 2 shows a flow diagram of a method of scanning interactable objects of a virtual world, in accordance with an embodiment of the present invention.

FIG. 2 shows a flow diagram of a method 200 of scanning interactable objects of a virtual world in accordance with an embodiment of the present invention. The method 200 may be performed by the VR interface 130 in conjunction with the backend system 140 as the user accesses a virtual world 110.

In step 201, the VR interface 130 receives an SRI of an interactable object. The VR interface 130 may receive the SRI from the virtual world 110.

In steps 202 and 203, the VR interface 130 does not scan the interactable object until the interactable object has been rendered (step 202 to step 203) and is in range for scanning (step 203 to step 205). That is, the VR interface 130 ignores the interactable object when the interactable object has not been rendered (step 202 to step 204) or is not within a predetermined distance to the user (step 203 to step 204).

In step 205, the VR interface 130 initiates scanning of the interactable object, when the interactable object has been rendered and is in range, by receiving features of the interactable object. The VR interface 130 may receive the features by extracting them from code or data of the interactable object provided by the virtual world 110 to the VR interface 130.

In step 206 to step 207, the VR interface 130 locally scans the interactable object when the VR interface 130 is capable of locally scanning the interactable object. For example, the VR interface 130 may scan the interactable object 130 when the VR interface 130 has a local reputation database that indicates a reputation of the interactable object, when the interactable object has a limited number of features, etc.

In step 206 to step 208, the VR interface 130 queries the backend 140 for the reputation of the interactable object when the VR interface 130 is incapable of locally scanning the interactable object. In that case, the VR interface 130 may provide the SRI and other available features of the interactable object to the backend system 140. The backend system 140 may consult the spatial reputation database 141 to determine the reputation of the interactable object. The backend system 140 may also consult the API chain database 142 to determine a reputation score of an API chain of the interactable object. The backend system 140 may deem the interactable object to be malicious when it has a malicious reputation or has an API chain with a reputation score that is below a threshold.

In step 209 to step 210, the interactable object is blocked when the interactable object is found to be malicious either from a local scan (step 207 to step 209) or remote scan (step 208 to step 209) of the interactable object.

In step 209 to step 211, the interactable object is allowed when neither the local scan nor the remote scan indicates that the interactable object is malicious, such as by simply ignoring the interactable object.

FIG. 3 shows a pseudocode 250 for scanning interactable objects of a virtual world, in accordance with an embodiment of the present invention.

The pseudocode 250 has a main function (FIG. 3, lines 0001-0018) that scans an in range and rendered element, which in this example is an interactable object identified by an SRI, other interactable objects that are subordinate to the interactable object, other interactable objects triggered by the interactable object, and other interactable objects that support the interactable object (FIG. 3, lines 0020-0028). In the pseudocode 250, an element is in range when the element is rendered in a viewport (i.e., viewable area even when not displayed) of the VR interface, displayed in the VR interface, hooked by another element that is within a distance D, hooked by a periodic function of another element that is within a distance D, hooked by a function running in the background in the virtual world, etc. (FIG. 3, lines 0030-0038). It is to be noted that being rendered in the viewport of the VR interface, in effect, sets a predetermined range distance as per the constraints of the operating system of the VR interface. The VR interface determines the reputation of the element if the VR interface is capable of doing so (FIG. 3, lines 0006 and 0007); otherwise, the backend system determines the reputation of the element (FIG. 3, lines 0008 and 0009).

Figure 4:
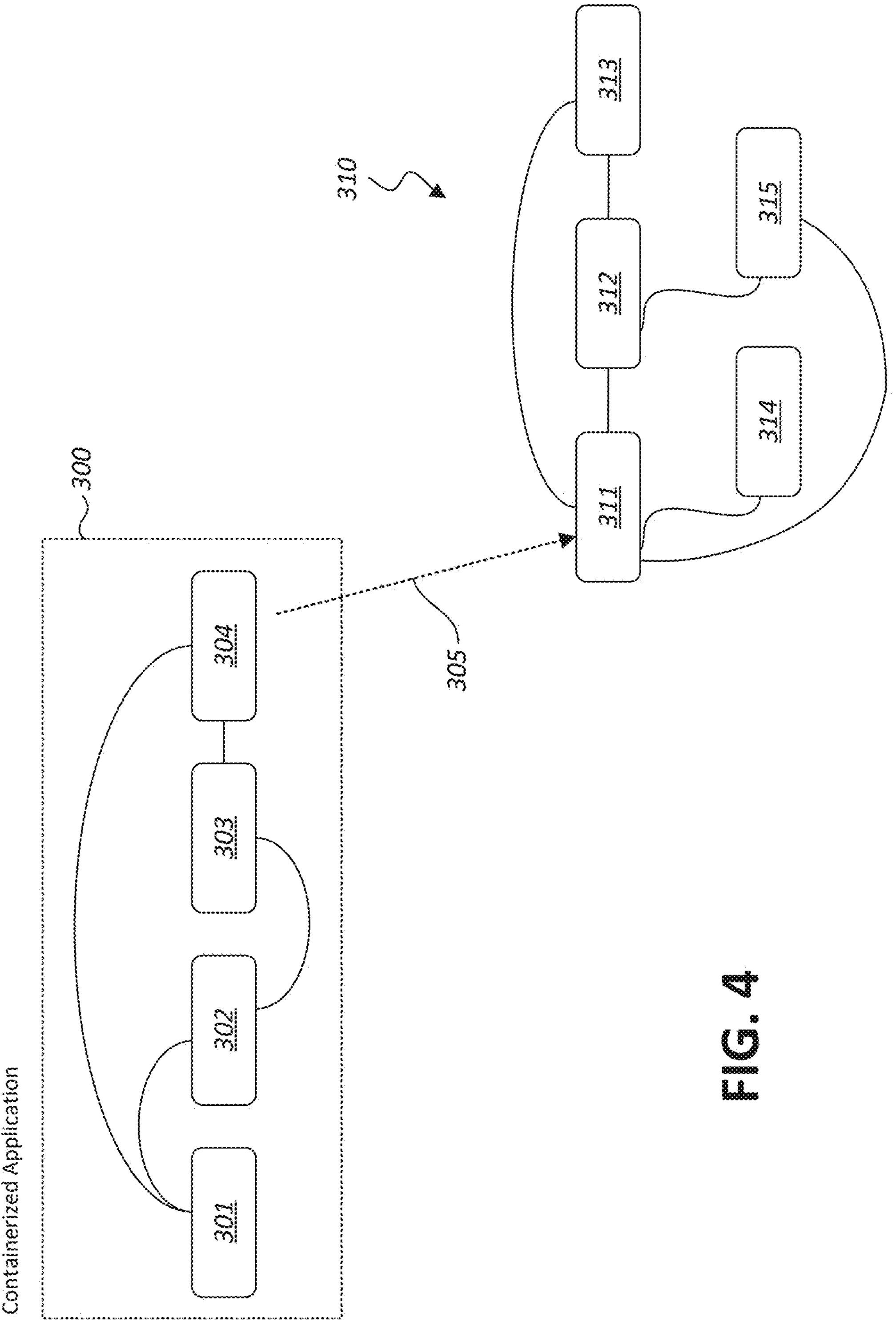
FIG. 4 shows an example containerized application of an interactable object that may be scanned in accordance with an embodiment of the present invention.

An application of an interactable object may be containerized, with the application including an API pipeline that includes an API chain as shown in FIG. 4. The use of an API pipeline allows the application to execute independently without needing to import functions or data from the virtual world in which they are executing, thereby allowing the application to flexibly move around and execute in multiple virtual worlds.

In the example of FIG. 4, a containerized application 300 of an interactable object includes, among other code, an API pipeline comprising APIs 301-304. The API 301 may directly call the API 302, the API 302 may directly call the API 303, which in turn may directly call the API 304. The API 301 may also directly call the API 304. The APIs 301-304 may also be called in sequential order by a code section in the containerized application 300 to form an API chain consisting of API 301, API 302, API 303, and API 304.

In the example of FIG. 4, the API 304 directly calls an API chain 310 (see arrow 305), which comprises APIs 311-315. That is, the API 304 may call the API 311, which in turn may call other APIs in the API chain 310 depending on the parameters passed to the API 311. The value returned by the API chain 310, if any, may be passed back to the API 304. The API chain 310 may also consists of APIs 311-315 that are called in a specific order by a code section in the containerized application 300. That is, the code section may call the APIs 311-315 sequentially, one by one. In that case, the API chain 310 will consist of API 311, API 312, API 313, API 314, and API 315, in that specific order.

In the example of FIG. 4, the API chain 310 is from a third-party provider, which is not necessarily trustworthy. Coming from a third-party provider also means a developer of an application doesn't have full control over the code and 100% of the code is not written by the developer. Use of third-party code is necessary, else the development cycle would be too long and expensive. Generally, API chains included in the containerized application 300 may need to be scanned determine if the API chains are malicious, such as whether an API chain performs malicious behavior or is infected with malware.

Figure 5:
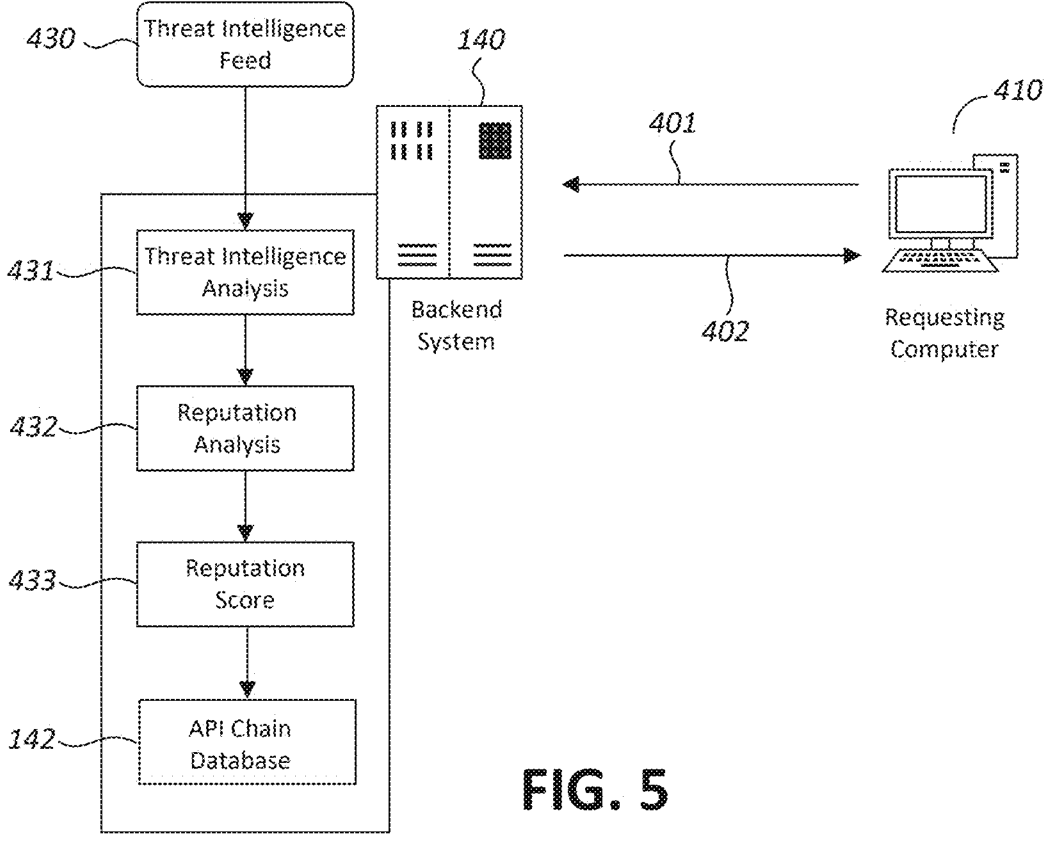
FIG. 5 shows a block diagram of a backend system for processing requests for reputations or reputation scores of application programming interface (API) chains, in accordance with an embodiment of the present invention.

FIG. 5 shows a block diagram of the backend system 140 for processing requests for reputation or reputation score of an API chain, in accordance with an embodiment of the present invention. In the example of FIG. 5, a reputation score of a target (i.e., being evaluated) API chain is generated in the backend system 140 by receiving a threat intelligence feed 430, performing threat intelligence analysis 431 on threat intelligence data from the threat intelligence feed 430 to generate a risk rating of the target API chain, and performing an initial reputation analysis 432 of the target API chain based at least on the risk rating. The risk rating from the threat intelligence analysis 431 and the initial reputation from the reputation analysis 432 may be combined to generate a reputation score 433 of the target API chain, which is stored in the API chain database 142. The threat intelligence analysis 431 and the reputation analysis 432 may be performed by cybersecurity experts on the backend system 140 or other computer system using suitable software, including machine learning, data mining, visualization tools, automation scripts, etc. without detracting from the merits of the present invention.

A requesting computer 410 may request the backend system 140 for a reputation of a target API chain that is in a containerized application of an interactable object (see arrow 401). The requesting computer 410 may be a computer system 112 of a virtual world 110, a VR interface 130, a client computer, or other computer system. The requesting computer 410 may provide the target API chain to the backend system 140 by providing the containerized application, by providing only the target API chain, or by some other predetermined arrangement without detracting from the merits of the present invention. The backend system 140 consults the API chain database 142 for the reputation score of the target API chain and returns a result to the requesting computer 410 (see arrow 402).

When the API chain database 142 has a reputation score of the target API chain, the result may be the reputation score or a quantized representation of the reputation score. The quantized representation may indicate that the target API chain has a malicious reputation when the reputation score is below a reputation threshold, or that the target API chain has a normal reputation when the reputation score is equal to or exceeds the reputation threshold. When the API chain database 142 does not have a reputation score of the target API chain, the result may indicate that the target API chain has an unknown reputation.

A reputation score of the target API chain is generated when the target API chain has no reputation score in the API chain database 142. Relevant API data are extracted from the target API chain to initiate generation of the reputation score. The extracted API data may include:

(a) Information about the provider (i.e., developer, vendor) of the target API chain and any digital signatures/signed certificates.

(b) All API calls in the target API chain and their interaction with each other.

(c) API dependencies, on other API calls in the target API chain, or third-party libraries that need to be packaged inside the container for the target API chain to execute correctly.

(d) API input-output parameters, returns values, access control, error handling, etc.

(e) API authentication and authorization mechanisms.

The reputation analysis 432 includes using the extracted API data of the target API chain to determine an initial reputation of the target API chain based on, for example, the following:

(a) The track record of the provider of the target API chain. A long-standing and well-established provider with a proven track record is more likely to offer secure and reliable API chains.

(b) Community feedback about the target API chain, e.g., research user reviews, developer forums, and social media, to gather feedback about the target API chain. Positive feedback and user experiences can be an indicator of a reputable API chain.

(c) Published API documentation—check the documentation of the target API chain for clarity, comprehensiveness, and ease of understanding. Transparent providers will have well-organized and detailed documentation about their API chains, including functionalities, limitations, and possible risks.

(d) Publicly known vulnerabilities—search for records of known vulnerabilities in the target API chain and if the provider has released patches to fix those vulnerabilities. Also check how responsive the provider has been in fixing a vulnerability once it has been disclosed.

(e) Third-party audits and certifications—assess whether the target API chain provider has undergone third-party audits or has received certifications from reputable organizations. A provider with recognized certifications and positive audit results is more likely to adhere to security best practices and maintain a secure API chain.

(f) Risk rating from the threat intelligence analysis 431.

The threat intelligence analysis 431 includes receiving threat intelligence data from the threat intelligence feed 430. The threat intelligence feed 430 may include the following threat intelligence data:

(a) Indicators of Compromise (IoC)—IoCs are evidence that a security incident has occurred or is in progress. Some examples of IoCs include IP addresses, URLs, domain names, file hashes, and email addresses associated with the threat being investigated.

(b) Tactics, Techniques, and Procedures (TTPs)—TTPs describe the behavior and methods used by threat actors to carry out cyberattacks. This information can help identify patterns in attacks, as well as the fingerprints of groups carrying out the attacks.

(c) Known Vulnerabilities in software and hardware.

(d) Threat actor profile—information about specific threat actors or groups, such as their methods, motivations, capabilities, and targeting preferences, can help organizations understand the risks they face.

(e) Geo-political context—cyber threats often have a geopolitical aspect, such as nation-states and other politically motivated groups engaged in cyber warfare and espionage.

The threat intelligence analysis 431 includes assessing the threat intelligence data to generate a risk rating. The assessment of the received threat intelligence data includes, for example, the following:

(a) Cross-reference with malicious sources—compare the target API chain provider's domain, Internet protocol (IP) addresses, or other identifying information with known threat intelligence feeds of malicious sources, such as blacklisted IPs, domains, or Uniform Resource Locators (URLs). If a match is found, it may indicate that the target API chain is associated with a potentially malicious provider or has been compromised in the past.

(b) Security incidents and breaches at the target API chain provider-threat intelligence feeds can provide information about past security incidents or data breaches involving the target API chain provider. By analyzing this data, it can be determined if the provider has a history of security issues, which may impact the trustworthiness of their API chains.

(c) Analyze malware samples that use the target API chain. Analyzing these samples can help identify patterns or behaviors that may be indicative of potential risks associated with the target API chain.

(d) Identify relationships with other known malicious entities—search for connections between the target API chain provider and other known malicious entities, such as cybercriminal groups, botnets, or Advanced Persistent Threat (APT) actors. If such connections are found, it raises concerns about the provider's trustworthiness and the security of their API chains.

(e) Track threats and trends that use the target API chain—track emerging threats and trends related to API chains and their providers. By keeping up to date with the latest threat intelligence, the evolving risk landscape can be better understood. Also, this allows the threat intelligence risk rating of the target API chain to be automatically updated as new data become available.

(f) Keep a clean list of API chains for reference. For example, an API chain created by a reputable software vendor that provides basic network connectivity will be used by both normal as well as malicious applications, because it is a basic building block.

(g) Check that virtual objects that use API chains is using secure methods for communication and is using encryption. The absence of a basic level of encryption/security would automatically mark the virtual object as non-compliant and thus inadmissible to the virtual world because they failed in providing basic security features which are a minimum.

(h) Correlating with vulnerability data about API chains/zero-days—the threat intelligence feed includes information about known vulnerabilities in various API chains. By correlating this data with the target API chain provider's history of handling vulnerabilities, insights into their security handling hygiene can be obtained.

(i) Dark Web monitoring—actively monitor discussions about API chains in the Dark Web and criminal underground forums. Look for information, such as stolen API keys, compromised API endpoints, zero-day vulnerabilities related to API chains, malicious API chains, attacker TTPs, threat actor discussions about API chains, insider threat type of messages, API related breaches, security research and vulnerability disclosure discussions around API chains. By monitoring these aspects on the Dark Web, potential threats and vulnerabilities related to API chains may be identified and mitigated before they can be exploited by attackers.

The risk rating from the threat intelligence analysis 431 and the initial reputation from the reputation analysis 432 may be combined to generate the reputation score of the target API chain. This reputation score is a composite of the severity, criticality, timeliness, and confidence in the risk rating and the initial reputation. For example, the risk rating and initial reputation may be weighted and adjusted by a confidence factor to generate the reputation score of the API chain.

To facilitate portability across virtual worlds and scanning for malware, the data format of an interactable object may be predefined to include several layers. A layer is a level of abstraction of the application, which in this example is that of an interactable object. Each layer may have its own set of instructions and data, and may interact with other layers by APIs, for example. Files of the layers are incorporated in the container of the interactable object. The user code (i.e., program code added by the developer, as opposed to automatically by a compiler) of the interactable object may be stored in a type of architecture-agnostic bytecode, similar to the Java™ bytecode, that can execute in a virtual world environment's localized virtual machine. The interactable object may be made architecture-agnostic by being compatible or abstracting itself to be compatible with different hardware and operating systems.

More particularly, an interactable object may have several layers, including a data layer, 3D graphics layer, interaction layer, network layer, code layer, compatibility layer, security layer, user interface (UX) layer, integration layer, content management layer, accessibility layer, documentation layer, audio layer, hardware layer, and operating system layer. FIGS. 6-10 show a table that illustrates the just-mentioned layers of an interactable object, in accordance with an embodiment of the present invention. The table of FIGS. 6-10 is explained in the context of a virtual guitar for illustration purposes only. As can be appreciated, the layers of the table of FIGS. 6-10 may be employed for other interactable objects. An interactable object may have additional or fewer layers depending on implementation particulars. For example, the table of FIGS. 6-10 includes an audio layer because the example interactable object is a virtual guitar; interactable objects that have no audio do not necessarily need an audio layer.

In the example of FIGS. 6-10, the first column (starting from the left of the table) indicates the layer, the second column indicates the component of the layer, the third column provides a description of the components of the layer, and the fourth column provides example/details of the components of the layer.

An interactable object may have a data layer (see FIG. 6, 501) that includes the base object data of the interactable object, metadata about the interactable object, and state data that indicates a current state of the interactable object. An example data layer of a virtual guitar may be as follows:

{"id": "VRGuitar001", "type": "StringInstrument", "dimensions": {"length": "100 cm", "width": "35 cm", "height": "8 cm"}, "material": "VirtualWood", "color": "Sunburst"}

{"creator": "User123", "creationDate": "2023-01-15", "uniqueID": "VRG-2023-01-15-123"}

{"position": {"x": 0, "y": 0, "z": 0}, "orientation": {"pitch": 0, "yaw": 0, "roll": 0}, "inUse": false}

In the above example, the data layer of the virtual guitar provides an identifier of the guitar, identifies the guitar as a string instrument, provides the dimensions of the guitar, etc. The data layer of the virtual guitar further includes information about the creator of the virtual guitar, and the current state of the virtual guitar regarding position, orientation, and whether the virtual guitar is in use.

An interactable object may have a 3D graphics layer (see FIG. 6, 502) that includes a modelling component that defines the virtual guitar's geometry; a texturing component that defines surface textures and materials; and an animation component that defines rigging and animation data for moving parts.

An interactable object may have an interaction layer (see FIG. 6, 503) that includes a physics engine that defines physical interactions (e.g., vibration, collision, etc.) and code for user interactions with the guitar.

An interactable object may have a network layer (see FIG. 7, 504) that includes a synchronization protocol for ensuring consistent state across users and environments, and data transfer methods for transferring object data.

An interactable object may have a code layer (see FIG. 7, 505) that provides the logic of the application. The code layer is also referred to herein as "user code" because it contains the code created by the user; other code in other layers are usually from third parties or standardized components. In the example table of FIGS. 6-10, the code layer includes code that defines the virtual guitar's behavior and responses. An example C#/C++/C scripts snippet for sound and tuning mechanics of the virtual guitar may be as follows:

GET /api/vr-guitar/{id},

POST /api/vr-guitar/transfer

In the above example, the API chain comprises "/api/vr-guitar/{id}" followed by "/api/vr-guitar/transfer".

An interactable object may have a compatibility layer (see FIG. 7, 506) that includes adapters for adapting to different environments and cross-platform standards for ensuring adherence to virtual reality/augmented reality (VR/AR) industry standards.

An interactable object has a security layer (see FIG. 7, 507) that includes an encryption component for protecting data during transfer and storage, and access control components for ensuring only authorized interactions with the virtual guitar.

An interactable object may have a user interface layer (see FIG. 7, 508) that includes tools for user customization of interaction with the virtual guitar, and feedback systems enhancing user engagement.

An interactable object may have an integration layer (see FIG. 7, 509) that includes an external services component for connecting with external databases, cloud services, or APIs, and an inter-world transport protocol for transferring the virtual guitar between virtual worlds.

An interactable object may have a content management layer (see FIG. 8, 510) that includes an asset management component for managing the storage, versioning, and retrieval of virtual reality assets, and a localization and internationalization component for adapting content for different languages and cultures.

An interactable object may have an accessibility layer (see FIG. 8, 511) that includes adaptive interfaces for providing accessibility features for diverse user needs, and accessibility guidelines for ensuring the interactable object meets accessibility standards.

An interactable object may have a documentation and support layer (see FIG. 8, 512) that includes user guides that provide comprehensive documentation for users, and a technical support component for providing technical assistance to users.

An interactable object may have an audio layer (see FIG. 9, 513) that includes a spatial sound design component for creating audio that reflects the 3D space of the virtual world; a sound effects integration component for incorporating sound effects linked to interactions and events; an ambient soundscapes component that provides background audio to create immersive environments; a dynamic audio adjustments component for adjusting audio in real-time based on user interactions and context; audio APIs for integrating and managing audio components; and accessibility features for ensuring audio is accessible for all users, including those with hearing impairments.

An interactable object may have a hardware layer (see FIG. 9, 514) that includes input/output devices for user interaction; sensor integration components for incorporating various sensors for enhanced interaction; performance optimization components for smooth operation; and hardware compatibility components for ensuring compatibility with a wide range of virtual reality hardware.

An interactable object may have an operating system layer (see FIG. 10, 515) that includes a system interface for interfacing with the underlying operating system for resource management; multi-tasking and threading component for handling multiple processes and threads efficiently; security and permissions component for managing security protocols and user permissions at the operating system level; driver integration components for integrating with drivers for hardware communication; operating system-specific features that leverage unique features offered by different operating systems; and an update and maintenance component for managing updates and compatibility with operating system updates.

An interactable object, comprising layers as described above, operates as an ecosystem of functionalities invoked via API calls. To facilitate portability across different virtual worlds, the functionality of the interactable object is encapsulated as a containerized application. This containerization enables the interactable object to function in multiple environments without code or data dependency issues, and minimizes the risk of external interference. For instance, the functionality of the interactable object would be unaffected by error messages or incorrect inputs from external servers. Additionally, since all functionalities are contained within one object, it simplifies the process of scanning for any malicious components before allowing entry into the virtual world. A possible downside is that the containerized interactable object (i.e., a containerized application of the interactable object) becomes a large binary object. However, this is a reasonable trade-off in exchange for seamless movement between different virtual worlds without dependency issues.

Figure 11:
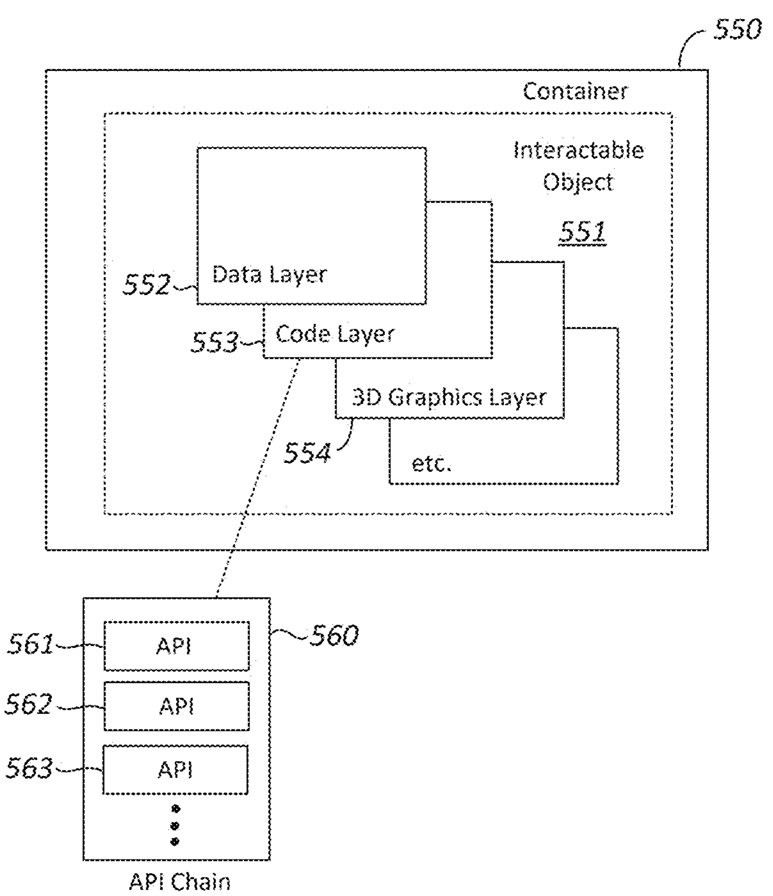
FIG. 11 shows a block diagram of a containerized interactable object, in accordance with an embodiment of the present invention.

FIG. 11 shows a block diagram of a container 550 that contains an interactable object 551, in accordance with an embodiment of the present invention. The interactable object 551 comprises several layers 552, 553, 554, etc. that are in the container 550. In the example of FIG. 11, a code layer 553 of the interactable object 551 includes a code section that calls an API 561, thereafter calls an API 562, and thereafter calls an API 563. An API chain 560 in the example of FIG. 11 consists of API 561, API 562, and API 563. A matching API chain would have the same APIs 561-563 that are called in the same order in the associated code section. The APIs to be included in an API chain may be selected based on what the API chain does. Example widely used API chains are now explained below.

In a first example, the calc.exe program from the MICROSOFT WINDOWS operating system may have, depending on version, the following assembly code snippet:

```
call    cs:GetSystemTimeAsFileTime
mov     rbx, qword ptr
        [rsp+28h+SystemTimeAsFileTime.dwLowDateTime]
call    cs:GetCurrentProcessId
mov     r11d, eax
xor     rbx, r11
call    cs:GetCurrentThreadId
mov     r11d, eax
xor     rbx, r11
call    cs:GetTickCount
lea     rcx, [rsp+28h+PerformanceCount]
mov     r11d, eax
xor     rbx, r11
call    cs: QueryPerformanceCounter
```

The assembly code snippet of the first example makes the following API calls, in a specific order, to form an API chain consisting of: "GetSystemTimeAsFileTime", "GetCurrentProcessId", "c$: GetCurrentThreadId", "GetTickCount", and "QueryPerformanceCounter". The number of APIs to retain to form an API chain depends on the particulars of the cybersecurity application. In the above assembly code snippet, the call to "GetSystemTimeAsFileTime" obtains the current system time in a specific format; the call to "GetCurrentProcessId" and "GetCurrentThreadId" get the unique identifiers of the current process and thread; the call to "GetTickCount" gets the system uptime in milliseconds; and the call to "QueryPerformanceCounter" gets a high-resolution performance count. The API chain makes the API calls in the specific order, and performs other operations, to generate a pseudo-random value, which may be used in security or cryptography.

In a second example, code for basic network operation in the C language using the MICROSOFT WINDOWS socket may have the following code snippet:

```
#include <winsock2.h>
#include <ws2tcpip.h>
int main( ){
    WSADATA wsaData;
    SOCKET s;
    struct sockaddr_in server;
    char *message="Hello Server";
    WSAStartup (MAKEWORD (2, 2,), &wsaData; //1
    s=socket (AF_INET, SOCK_STREAM, 0); //2
    server.sin_addr.s_addr=inet_addr ("192.168.1.10"); //3
    server.sin_family=AF_INET //4
    server.sin_port=htons(80); //5
    connect(s, (struct.sockaddr *)&server, sizeof (server))
      //6
    send (s, message, strlen (message), 0) //7
    closesocket(s); //8
    WASCleanup( ); //9
    return 0;
}
```

The second example calls the following APIs, in order: "WSAStartup", "socket", "inet_addr", "AF_INET", "htons", "connect", "send", "closesocket", and "WSA-Cleanup". In the second example, the call to "WSAStartup" initializes Winsock; the call to "socket" creates a new socket; the call to inet_addr converts a string to a network address; the call to "AF_INET" specifies the IPv4 address family; the call to htons performs a Host-to-network short integer conversion; the call to "connect" establishes a connection to a specified socket; the call to "send" sends data on a connected socket; the call to closesocket closes an existing socket; and the call to "WSACleanup" terminates the use of the Winsock DLL. A portable executable file that opens and closes a socket typically uses this API chain to achieve whatever task the program is designed to execute. Therefore, the API chain indicates the opening and closing of a network socket and will be executed in the logical sequence as indicated in the API chain. Subsequently, focus may be made on determining whether any other API chains are employed in conjunction with this known API chain. Using this particular API chain does not inherently suggest malicious intent; however, it can be combined with other API chains or functions to introduce malicious behavior into the binary.

Figure 12:
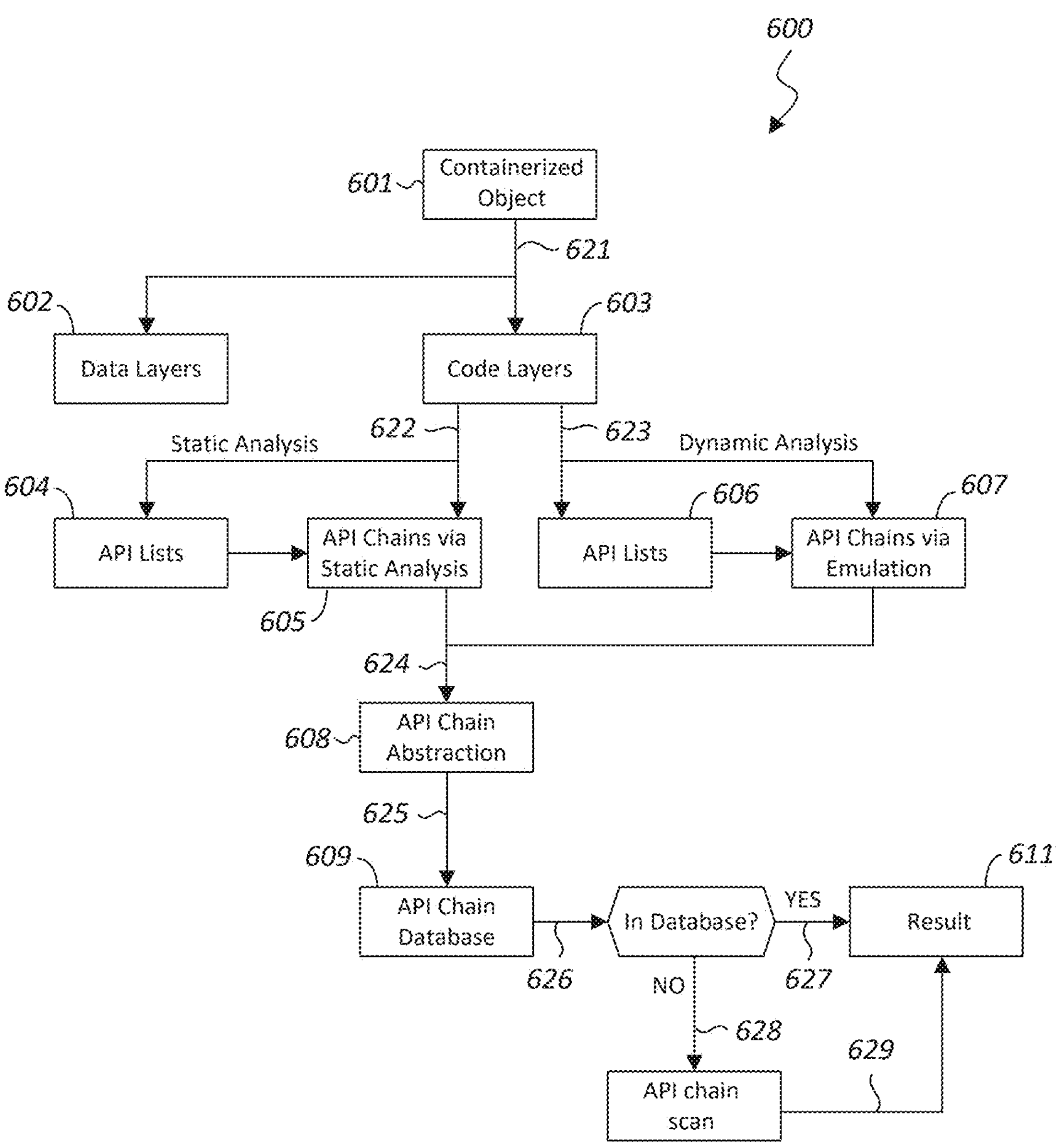
FIG. 12 shows a flow diagram of a method of scanning API chains in a containerized interactable object, in accordance with an embodiment of the present invention.

FIG. 12 shows a flow diagram of a method 600 of scanning API chains in a containerized interactable object, in accordance with an embodiment of the present invention. The method 600 may be performed by, if capable, a scanner engine of a VR interface in conjunction with a backend system. The method 600 may also be performed solely by the backend system to populate an API chain database 609.

In the example of FIG. 12, a containerized interactable object 601 includes a plurality of layers, including data layers 602 and code layers 603. The code layers 603 are extracted from the container and analyzed for presence of API chains (see arrow 621). In one embodiment, the data layers 602 are not analyzed further unless code is found in the data layers 602 during emulation of the code layers 603.

A relatively simple static scan of the code layers 603 is performed to obtain an API list 604 of imported and/or exported API names, as well as to build code flow graphs to extract API Chains 605 that are inside the code layers 603 (see arrow 622).

A dynamic analysis is performed to obtain an API list 606 of APIs and API chains 607 that have not been identified by static analysis, e.g., APIs that are dynamically linked and APIs in encrypted routines (see arrow 623). The dynamic analysis may be performed by emulation, which involves executing a few thousand instructions of each code layer 603. APIs not identified by static analysis may be revealed during the execution.

Each API chain that has been identified in the code layers 603 is converted into an API chain abstraction 608 for quick look up against the API chain database 609 (see arrow 624). The API chain abstraction 608 may simply be a hash of the API chain, or more complex like generating a simplified pseudocode to compress the API chain and abstract functionalities.

A query is sent to the API chain database 609 (see arrow 625) to determine if the API chain abstraction 608 has a corresponding entry in the API chain database 609 (see arrow 626). An entry in the API chain database 609 includes an API chain abstraction of an associated API chain (for identification) and a result of scanning the associated API chain for malware.

When the API chain database 609 has an entry for the API chain abstraction 608, i.e., the associated API chain has already been scanned for maliciousness, a result 611 of the scanning is obtained from the API chain database 609 (see arrow 627). Otherwise, when the API chain database 609 has no entry for the API chain abstraction 608, the associated API chain is scanned (see arrow 628) to obtain a result 611 of the scanning (see arrow 629). The result 611 may be a reputation or reputation score of the API chain.

It is to be noted that although scanning of API chains is explained in the context of a containerized interactable object, embodiments of the present invention are equally applicable to other containerized API chains and to API chains in general. In embodiments that do not involve containerization, the API chains may be identified in and extracted directly from code sections and scanned as described herein.

Figure 13:
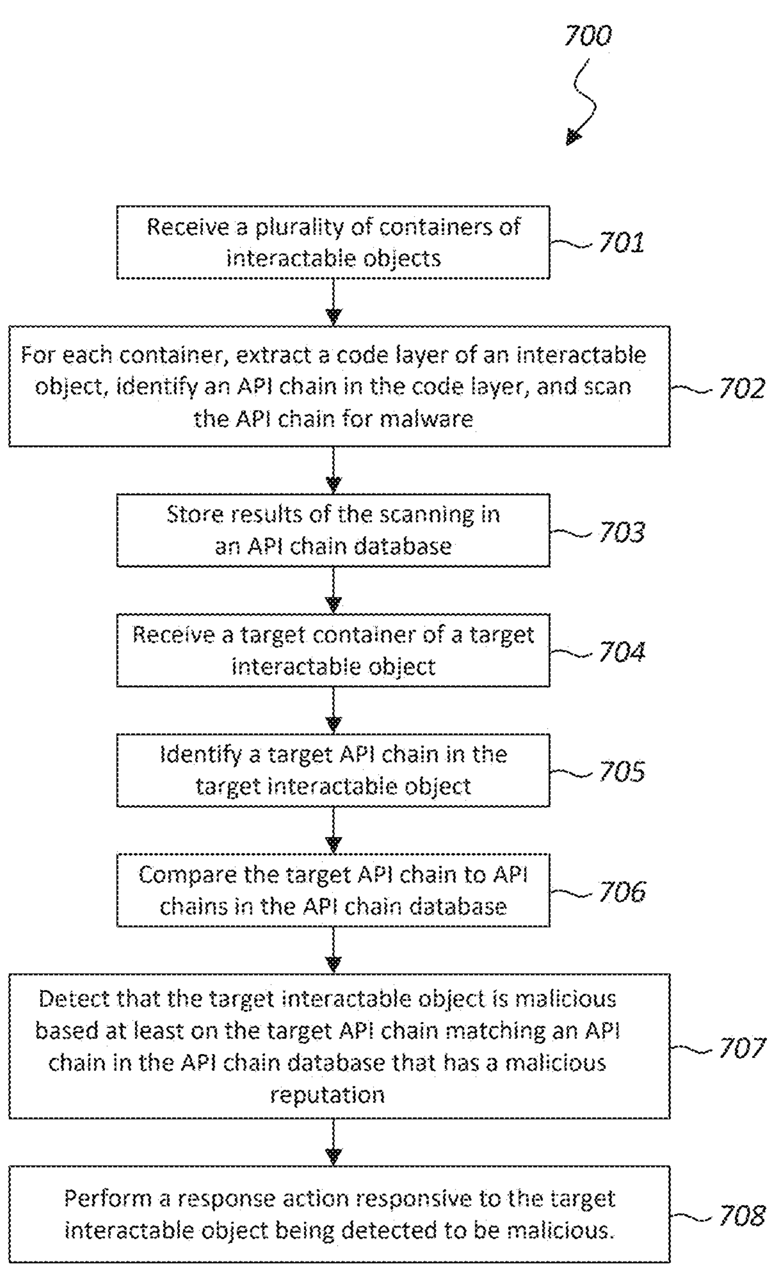
FIG. 13 shows a flow diagram of a method of scanning interactable objects of a virtual world, in accordance with an embodiment of the present invention.

FIG. 13 shows a flow diagram of a method 700 of scanning interactable objects of a virtual world, in accordance with an embodiment of the present invention. The method 700 may be performed by a scanning engine of a VR interface in conjunction with a backend system.

In step 701, the backend system receives a plurality of containers of interactable objects of one or more virtual worlds.

In step 702, for each container of the plurality of containers, the backend system extracts a code layer of the plurality of layers of the container, identifies an API chain in the code layer, and scan the API chain to determine its reputation. For example, the scanning may yield a reputation score of the API chain. The reputation score may be compared against a threshold to determine the reputation of the API chain, e.g., whether the API chain is malicious or normal.

In step 703, the backend system stores the results of the scanning in an API chain database.

In step 704, a scanning engine of a VR interface receives a target container of a target interactable object.

In step 705, the scanning engine identifies a target API chain in the target interactable object.

In step 706, the target API chain is compared to API chains in the API chain database. Step 706 may be performed by sending the target API chain or an abstraction of the target API chain from the VR interface to the backend system, which performs the comparison. Step 706 may also be performed in the VR interface by storing in the VR interface all or a subset of the API chains (and scanning results) that have been scanned in the backend system.

In step 707, the target interactable object is detected to be malicious based at least on the target API chain matching an API chain among the API chains that have been scanned in the backend system, wherein the matching API chain has a malicious reputation. The target API chain matches the matching API chain in that each of the target API chain and the matching API chain comprises a plurality of APIs that are called in both the target interactable object and an interactable object associated with the matching API chain (i.e., the interactable object that has the matching API chain). The detection that the target interactable object is malicious may be made in the backend system, which then reports the detection to the scanning engine of the VR interface.

In step 708, a response action is performed responsive to detecting that the target interactable object is malicious. The response action may be performed by the VR interface, the backend system, and/or other cybersecurity component. The response action may include blocking the interactable object, raising an alert, or other remediation/mitigation action. Raising an alert includes sending a notification to personnel responsible for cybersecurity, displaying a warning message on a display screen of the VR interface or administration computer, or other ways of notifying the user or personnel responsible for cybersecurity.

As can be appreciated, the scanning of API chains as disclosed herein is especially advantageous when performed in cybersecurity operations involving interactable objects of virtual worlds. It is to be noted, however, that embodiments of the present invention are equally applicable to scanning API chains in general. In other words, an application program that is not necessarily an interactable object or containerized may include API chains that can be scanned as disclosed herein.

Figure 14:
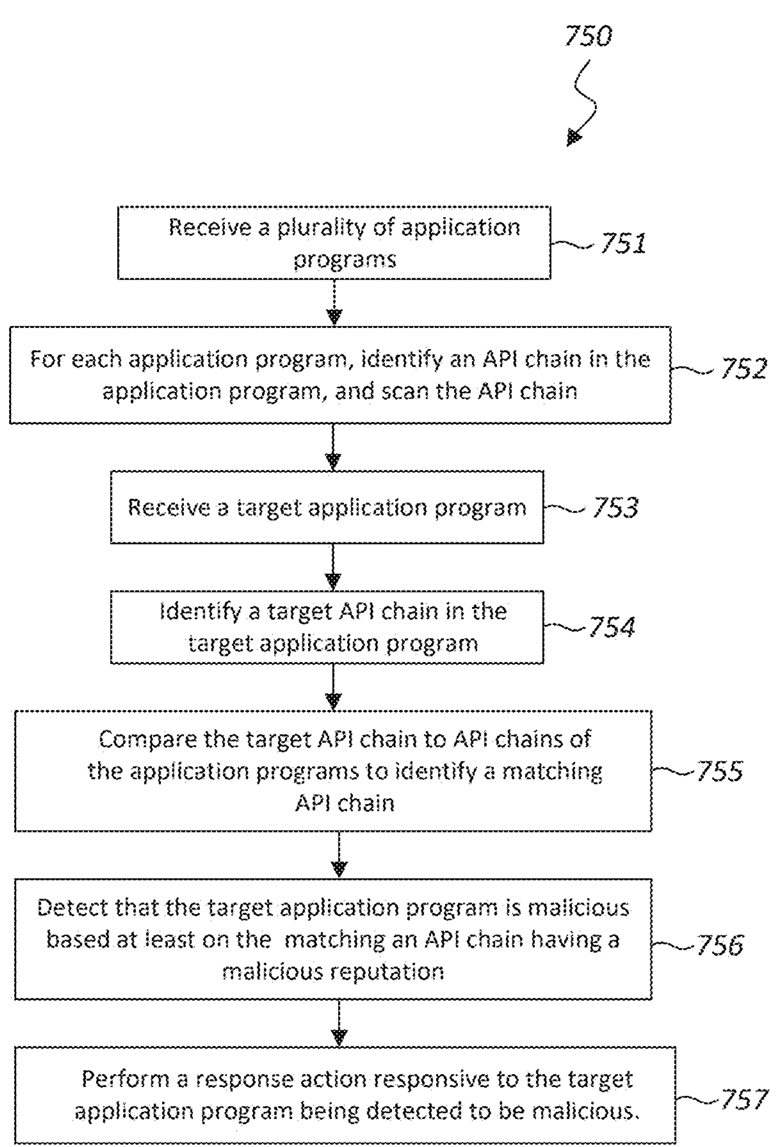
FIG. 14 shows a flow diagram of a method of scanning API chains of application programs, in accordance with an embodiment of the present invention.

FIG. 14 shows a flow diagram of a method 750 of scanning API chains of application programs, in accordance with an embodiment of the present invention. The method 750 may be performed by a requesting computer and a backend system.

In step 751, the backend system receives a plurality of application programs. The application programs may be collected by honeypot computers, cybersecurity vendors, etc.

In step 752, for each application program, the backend system identifies an API chain in the application program and scans the API chain to determine its reputation. For example, the scanning may yield a reputation score of the API chain; the reputation score may be compared against a threshold to determine the reputation of the API chain, e.g., whether the API chain is malicious or normal.

In step 753, a requesting computer receives a target application program.

In step 754, the requesting computer identifies a target API chain in the target application program.

In step 755, the target API chain is compared to API chains of the application programs that have been scanned in the backend system. Step 755 may be performed by the requesting computer sending the target API chain or an abstraction of the target API chain to the backend system, which then performs the comparison.

In step 756, the target application program is detected to be malicious based at least on the target API chain matching an API chain among the API chains that have been scanned in the backend system, wherein the matching API chain has been found to be malicious. The target API chain matches the matching API chain in that each of the target API chain and the matching API chain comprises a plurality of APIs that are called in both the target application program and an application program associated with the matching API chain (i.e., the application program that includes the matching API chain). The detection that the target application program is malicious may be made in the backend system, which then reports the detection to the requesting computer.

In step 757, a response action is performed responsive to detecting that the target application program is malicious. The response action may be performed by the requesting computer, the backend system, and/or other cybersecurity component. The response action may include blocking the target application program, e.g., deleting the target application program, putting the target application program in quarantine, or other action that prevents the target application program from being executed. The response action may also include raising an alert, e.g., sending a notification to personnel responsible for cybersecurity, displaying a warning message on a display screen of the requesting computer, or other ways of notifying a user or personnel responsible for cybersecurity.

Figure 15:
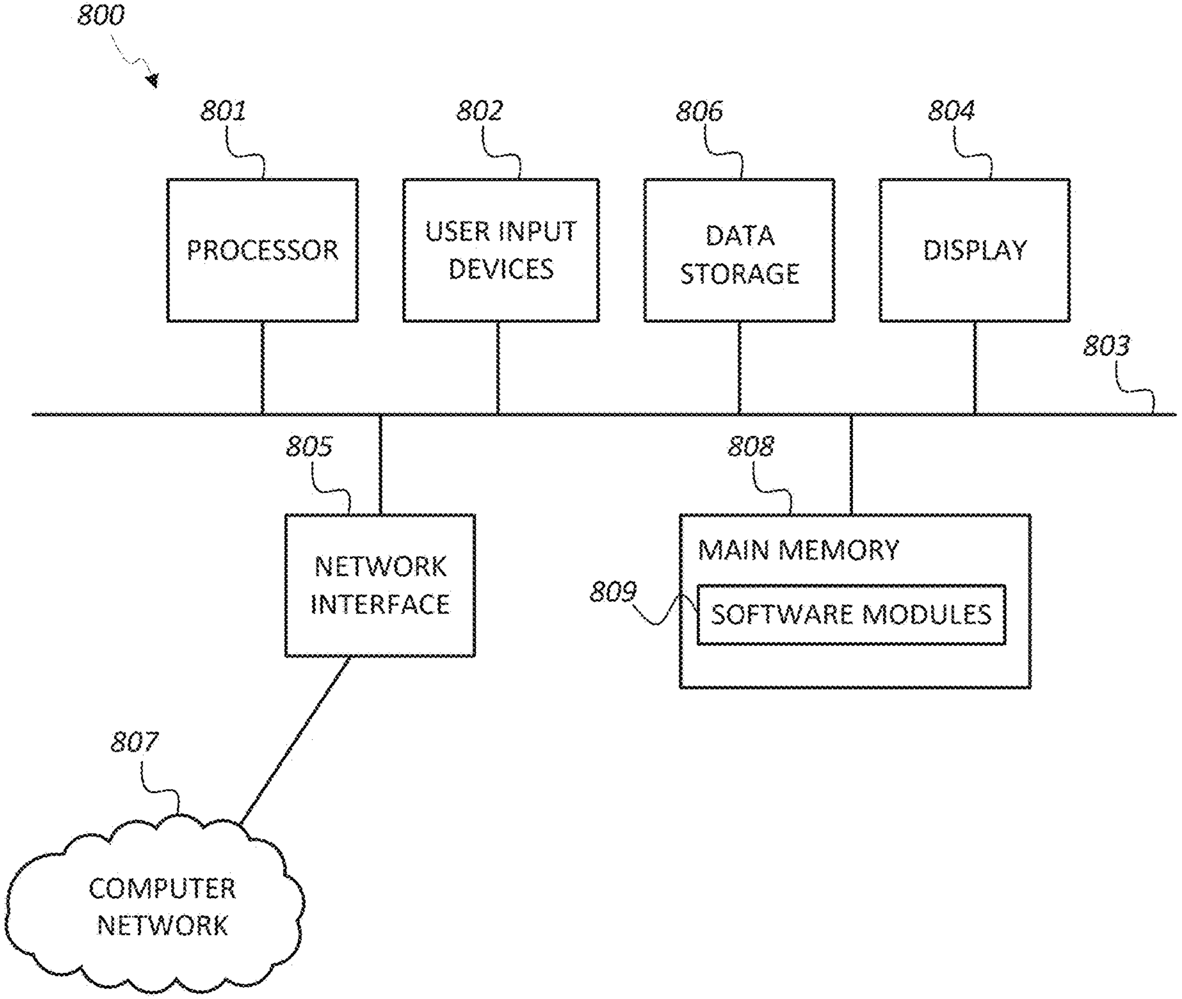
FIG. 15 shows a block diagram of a computer system that may be employed with embodiments of the present invention.

FIG. 15 shows a block diagram of a computer system 800 that may be employed with embodiments of the present invention. The computer system 800 may be employed as a VR interface, a backend system, computing infrastructure of a virtual world, requesting computer, or other computer described herein. The computer system 800 may have fewer or more components to meet the needs of a particular cybersecurity application. The computer system 800 may include one or more processors 801. The computer system 800 may have one or more buses 803 coupling its various components. The computer system 800 may include one or more user input devices 802, one or more data storage devices 806, a display screen 804, a computer network interface 805, and a main memory 808. The computer network interface 805 may be coupled to a computer network 807, which in this example includes the public Internet.

The computer system 800 is a particular machine as programmed with one or more software modules 809, comprising instructions stored non-transitory in the main memory 808 for execution by at least one processor 801 to cause the computer system 800 to perform corresponding programmed steps. An article of manufacture may be embodied as computer-readable storage medium including instructions that when executed by at least one processor 801 cause the computer system 800 to be operable to perform the functions of the one or more software modules 809.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of scanning interactable objects of a virtual world, the method comprising:

receiving a plurality of interactable objects of one or more virtual worlds, wherein respective ones of the plurality of interactable objects are artifacts in the one or more virtual worlds that a user logged in the one or more virtual worlds can interact with, wherein the respective ones of the plurality of interactable objects and their corresponding functionalities and dependencies are encapsulated in respective ones of a plurality of containerized applications;

for each containerized application of the plurality of containerized applications, extracting a code layer from a plurality of layers of an interactable object in the containerized application, identifying an application programming interface (API) chain in the code layer, scanning the API chain to determine a reputation of the API chain, and storing a result of the scanning in an API chain database;

receiving a target containerized application of a target interactable object, wherein the target interactable object and its corresponding functionalities and dependencies are encapsulated in the target containerized application;

identifying a target API chain in the target interactable object;

comparing the target API chain to API chains in the API chain database to identify a matching API chain that matches the target API chain, wherein the target API chain and the matching API chain each comprises APIs that are called in both the target interactable object and an interactable object of the plurality of interactable objects that includes the matching API chain; and detecting that the target interactable object is malicious based at least on the matching API chain having a malicious reputation.

2. The method of claim 1, further comprising:

performing a response action responsive to detecting that the target interactable object is malicious.

3. The method of claim 2, wherein the response action includes blocking the target interactable object.

4. The method of claim 2, wherein the response action includes raising an alert.

5. The method of claim 1, wherein identifying the target API chain comprises:

extracting a target code layer from a plurality of layers of the target interactable object; and identifying the target API chain in the target code layer of the target interactable object.

6. The method of claim 1, wherein identifying the API chain in the code layer includes:

executing a portion of code of the code layer; and identifying the API chain from APIs that have been revealed by the execution of the portion of code of the code layer.

7. A computer system comprising at least one processor and a memory, the memory storing instructions that when executed by the at least one processor cause the computer system to:

receive a plurality of interactable objects of one or more virtual worlds, wherein respective ones of the plurality of interactable objects are artifacts in the one or more virtual worlds that a user logged in the one or more virtual worlds can interact with, wherein the respective ones of the plurality of interactable objects and their corresponding functionalities and dependencies are encapsulated in respective ones of a plurality of containerized applications;

for each containerized application of the plurality of containerized applications, extract a code layer from a plurality of layers of an interactable object in the containerized application, identify an application programming interface (API) chain in the code layer, scan the API chain to determine a reputation of the API chain, and store a result of the scan in an API chain database;

receive a target containerized application of a target interactable object, wherein the target interactable object and its corresponding functionalities and dependencies are encapsulated in the target containerized application;

identify a target API chain of the target interactable object;

compare the target API chain to API chains in the API chain database to identify a matching API chain that matches the target API chain, wherein each of the target API chain and the matching API chain comprises APIs that are called in both the target interactable object and an interactable object of the plurality of interactable objects that includes the matching API chain; and detect that the target interactable object is malicious based at least on the matching API chain having a malicious reputation.

8. The computer system of claim 7, wherein the instructions stored in the memory when executed by the at least one processor cause the computer system to identify the target API chain by:

extracting a target code layer from a plurality of layers of the target interactable object; and identifying the target API chain in the target code layer of the target interactable object.

9. The computer system of claim 7, wherein the instructions stored in the memory when executed by the at least one processor cause the computer system to:

perform a response action responsive to detecting that the target interactable object is malicious.

10. The computer system of claim 9, wherein the response action includes blocking the target interactable object.

11. The computer system of claim 9, wherein the response action includes raising an alert.

12. The computer system of claim 7, wherein the instructions stored in the memory when executed by the at least one processor cause the computer system to identify an API chain in a code layer of each of the plurality of interactable objects by:

executing a portion of code of the code layer; and identifying the API chain from APIs that have been revealed by the execution of the portion of code of the code layer.

13. The computer system of claim 7, wherein the computer system is a backend system that receives the target containerized application from a virtual reality (VR) interface.

* * * * *